Patented Feb. 9, 1943

2,310,679

UNITED STATES PATENT OFFICE 2,310,679

OXYALKYLATED LECITHIN AND METHOD OF MAKING SAME

Melvin De Groote and Bernhard Keiser, St. Louis, Mo., assignors to Petrolite Corporation, Ltd., Wilmington, Del., a corporation of Delaware No Drawing. Application April 27, 1942, Serial No. 440,748

5 Claims. (Cl. 260—403)

This invention relates to a new chemical product or compound, to wit, oxyalkylated lecithin, and to the manufacture of the same.

One object of our invention is to provide a practical method of making said oxyalkylated lecithin.

The new compound herein described is a product derived by treating a phosphatide of animal or vegetable origin with an oxyalkylating agent. Such oxyalkylation may take place in the presence of an inert solvent, such as a chlorinated hydrocarbon, xylene, a chlorinated ether, dioxane and the like. Higher ethers may be used.

Lipoids are a group of organic substances, one division of which is nitrogenous in nature. They are soluble in ether, and in the usual fat solvents. They are found in abundance in certain animal tissue and in certain nitrogenous vegetable products. One group of the lipoids which contains both nitrogen and phosphorus are known as phosphatides. Examples of the phosphatides are lecithin, cephalin, and sphengomyelin.

Any suitable phosphatide may be employed, but it is most desirable to use lecithin and associated materials obtained from soyabean oil, egg products and the like. In view of the increased production of soyabean oil, it appears that the most available low cost phosphatide or lecithin will be the product derived from the soyabean industry. For this reason we prefer to use compounds obtained from purified soyabean lecithin or soyabean lecithin with its associated cogeners, including cephalin.

We have found that compounds or products of the kind exemplified by lecithin and the like undergo oxyalkylation in the same manner as phenols, alcohols, amides, high molal amines, etc. In other words, the reaction takes place readily under pressures that rarely exceed 250 pounds, and more frequently at pressures approximating 125 pounds. The temperatures employed during oxyalkylation may vary from approximately the boiling point of water to temperatures not above 200° C. The time of reaction may be varied from an hour or less to as much as twenty hours. Usually, the presence of an alkaline catalyst, such as soap, sodium acetate, caustic soda, sodium methylate, or the like, is desirable. The amount of catalyst added may vary from one-half percent to one-tenth of a percent, or even less. Suitable inert solvents have been described. Any inert solvent may be employed, provided it does not decompose or cause any undue pressure under conditions of use. The oxyalkylating agents employed include those described in U. S. Patent No. 2,208,581, dated July 23, 1940, to Hoeffelmann. As typical examples of applicable compounds, may be mentioned glycerine epichlorhydrin, glycid alcohol, ethylene oxide, propylene oxide, butene-2-oxide, butene-1-oxide, isobutylene oxide, butadiene oxide, butadiene dioxide, chloro-prene oxide, isoprene oxide, decene oxide, styrene oxide, cyclohexylene oxide, cyclopentene oxide, etc.

Due to the greater activity of the low molal alkylene oxides and to the increased water solubility, or the hydrotropic property of their derivatives, we prefer to use ethylene oxide, propylene oxide, or glycid, as the oxyalkylating agent. In view of what has been said, it appears hardly necessary to give a specific example, but by way of illustration, the following are included:

Example 1

23½ pounds of lecithin was dissolved in 15 pounds of xylene, the solution was treated with approximately 4½ pounds of ethylene oxide and heated at 100° C. for three hours until the pressure, after reaching a maximum of 100 pounds, dropped to zero. The resultant product was a resin-like material insoluble in xylene, but fairly soluble in water.

Example 2

The same procedure is followed as in Example 1, except that an equivalent amount of propylene oxide is substituted for ethylene oxide.

Example 3

The same procedure is followed as in Example 1, except that an equivalent amount of glycid is substituted for ethylene oxide.

As has been previously pointed out, any suitable solvent can be employed. Furthermore, in such instances where an increased amount of oxyalkylating agent, particularly ethylene oxide, is introduced, one may employ a solvent in which the product resulting from initial oxyalkylation is either more soluble, or in which it can be suspended more readily than in xylene. If oxyalkylation takes place in the presence of an insoluble vehicle, then, of course, agitation must be more thorough than in the case where a solvent is employed. Furthermore, one might employ two different solvents in the course of oxyalkylation. Thus, in the preceding examples, where a product insoluble in xylene is obtained as the result of initial oxyalkylation, one may interrupt the process, remove the xylene, and then dissolve or suspend the initially oxyalkylated lecithin in some other solvent, such as dioxane, or the like, and then continue oxyalkylation in the presence of a newly selected solvent or suspending agent.

Lecithin finds many uses in a variety of arts, such as in the manufacture of cosmetics, as a dispersing agent in emulsions of both the water-in-oil type and the oil-in-water type, as an inhibitor to prevent discoloration of hydrocarbon motor fuel, as an additive in foods, etc.

It is obvious that such derivatives of the kind above described, particularly, oxyalkylated derivatives, will find utility in numerous instances where a lecithin showing enhanced hydrophile or hydrotropic properties is desirable. This is particularly true in such instances where cosmetics or the like are prepared using lecithin as an emulsifying agent in emulsions of the oil-in-water type. Furthermore, such oxyalkylated lecithin can be used as an intermediate, and thus it may be sulfonated, or sulfated, so as to give a demulsifying agent for breaking oil field emulsions comparable to products of the kind described in U. S. Patent No. 2,086,217, dated July 6, 1937, to Melvin De Groote. Similarly, effective demulsifying agents for water-in-oil emulsions can be obtained by using such oxyalkylated lecithin as an intermediate for reaction with polybasic acids, such as phthalic acid, and the like. Numerous other industrial uses suggest themselves for oxyalkylated lecithin, where the product, obviously due to its increased hydrophile or hydrotropic property, is better suited than lecithin itself. It is of course, understood that one may introduce sufficient oxyalkylating agent, for instance, ethylene oxide, to give complete or substantially complete water solubility. Thus, one might introduce 5, 10, 15, 20, or even 30 or 40 moles of ethylene oxide for each mole of lecithin. We have found that vegetable lecithins, particularly, soyabean lecithin, to be most desirable as a reactant.

Having thus described our invention, what we claim as new and desire to secure by Letters Patent is:

1. A new chemical compound, consisting of an oxyalkylated phosphatide.
2. A new chemical compound, consisting of an oxyalkylated vegetable lecithin.
3. A new chemical compound, consisting of an oxyalkylated soyabean lecithin.
4. A new chemical compound, consisting of an oxyethylated soyabean lecithin.
5. In the manufacture of the chemical compound described in claim 1, the step of oxyalkylating a phosphatide.

MELVIN DE GROOTE.
BERNHARD KEISER.